(No Model.)
J. H. BRAFFORD.
GATE HANGING AND OPERATING APPARATUS.
No. 296,516. Patented Apr. 8, 1884.
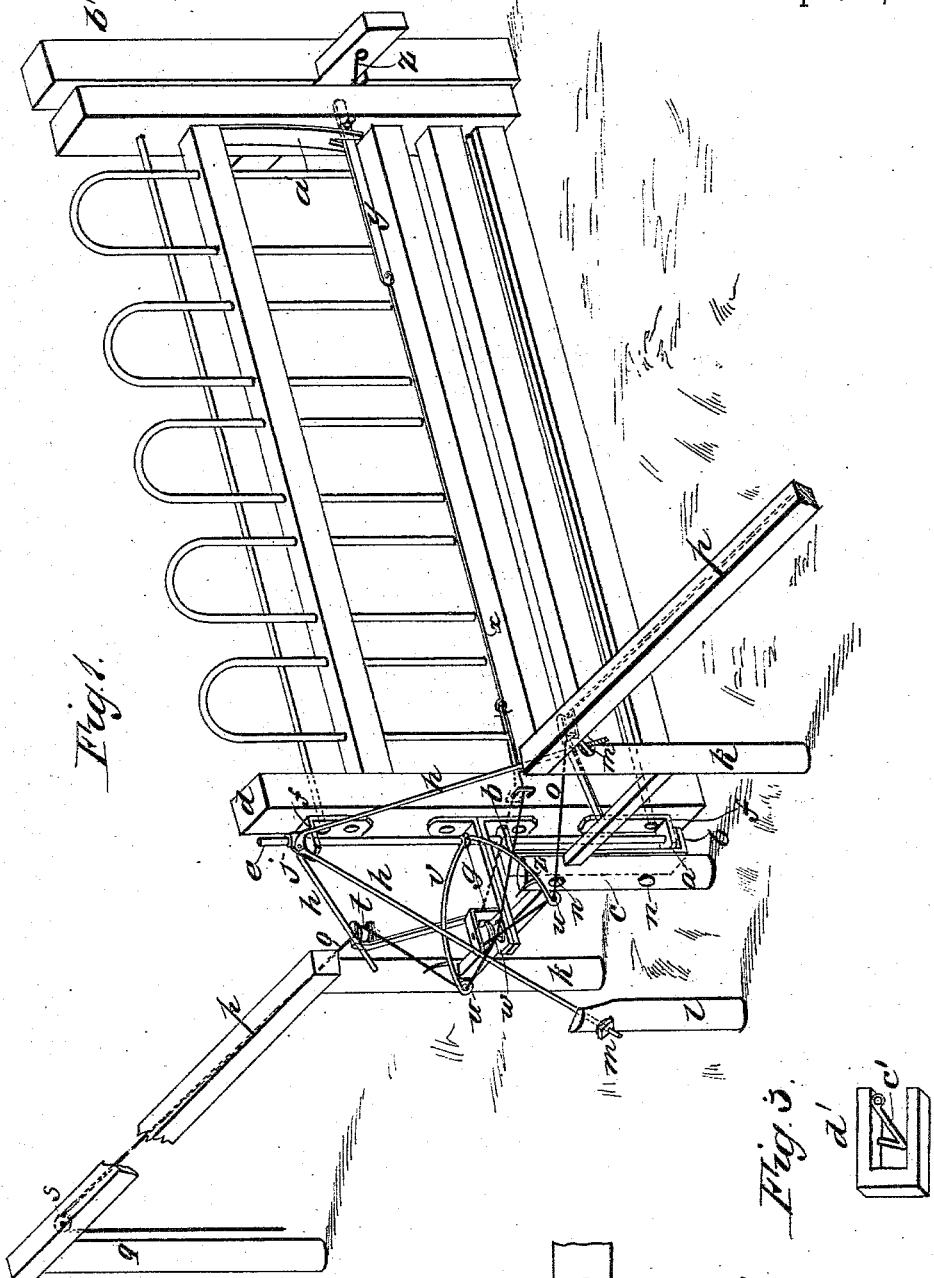
WITNESSES:
INVENTOR:
J. H. Brafford
BY
Munn & Co.
ATTORNEYS.

UNITED STATES PATENT OFFICE.

JOHN H. BRAFFORD, OF RED OAK, OHIO.

GATE HANGING AND OPERATING APPARATUS.

SPECIFICATION forming part of Letters Patent No. 296,516, dated April 8, 1884.

Application filed October 22, 1883. (No model.)

*To all whom it may concern:*

Be it known that I, JOHN H. BRAFFORD, of Red Oak, in the county of Brown and State of Ohio, have invented a new and Improved Gate Hanging and Operating Apparatus, of which the following is a full, clear, and exact description.

My invention consists of an improved contrivance of apparatus for hanging a gate in a simple and substantial manner, and so as to be adjusted readily from time to time as the gate sags; and my invention also consists of simple and efficient means for opening and closing the gate without dismounting from the carriage, all as hereinafter fully described.

Reference is to be had to the accompanying drawings, forming part of this specification, in which similar letters of reference indicate corresponding parts in all the figures.

Figure 1 is a perspective view of my improved gate. Fig. 2 is a detail showing a side elevation of the catch and section of the latch; and Fig. 3 is a perspective view of a catch on the posts against which the gate opens, to fasten the gate open while passing through it.

I hang the gate to a short upright metal bar, $a$, having angle ends $b$, and bolted to the side of a short post, $c$, set firmly in the ground. I connect the frame-post $d$ of the gate to said bar by the pintle-rod $e$, fitted in the ear-lugs $f$, and the arm $g$, attached to the frame-post, and also fitted in the angle ends $b$ of said bar $a$; and I stay the upper end of the frame-post $d$ by the stay-rods $h$, fitted on the pintle-rod $e$, by the eye $j$ on the upper ends of said rods, said rods passing at the lower ends through posts $k$ and $l$, to which they are secured by nuts $m$, by which the stay-rods may be strained up more or less, as required. The bar $a$ is attached to a foot, $e$, by bolts, $n$, which may be slacked off at any time to insert a wedge between bar $a$ and post $c$, to set the gate as required, and to raise up the free end in case the gate sags. The stays $h$ also facilitate the adjustment of the gate in this manner. The arm $g$ is mainly employed as a means of opening and closing the gate by cords $o$, extending along the rails $p$ to the posts $q$, or thereabout, where they may be pulled by persons riding in carriages or on horseback through the gateway, said cords being arranged on suitable guide-pulleys, $s$ and $t$; also through the eyes $u$, or over pulleys in the ends of the struts $v$, and around the double pulley $w$, mounted on the arm $g$, to the rod $x$, connected to one end of the latch-bar $y$, so that when either cord is pulled the latch-bar will first be pulled from between the spring-catches $z$, and then the gate will be swung open oppositely from the operator. The struts $v$ hold out the cords $o$ with relation to arm $g$, so as to prevent dead-points in the stretch of the cords. The spring $a'$ thrusts the latch forward when the pull of the cords $o$ ceases, to engage with the catches $z$ when the gate swings shut, and by pulling the cord on the other side of the gate, after passing through, the gate will be closed. The catches $z$ are self-fastening, and two are employed to prevent the gate from swinging past the post $b'$ when the gate swings shut.

I also use a single catch, $c'$, to fasten the gate open when the wind blows, said catch being arranged in a suitable yoke, $d'$, or notched block or bar, and attached to any post suitably located for the latch to engage with said catch when the gate opens, in the same manner as it engages with latches $z$ when the gate shuts. The latch is detached from this catch by the pulling of the cord for closing the gate in the same manner as it is unlatched for opening the gate.

Having thus described my invention, I claim as new and desire to secure by Letters Patent—

1. In a swinging gate, the combination, with the pivotal hinging-rod, of the gate having the upper and lower hinging-brackets and the intermediate arm, said rod passing through said brackets and arm, and said arm carrying a pulley or roll, the latch-rod, and the operating-cords connected to said latch-rod and passing over said pulley, substantially as and for the purpose set forth.

2. In a swinging gate, the combination, with the pivotal hinging-rod having the cord-supporting struts, of the gate having the upper and lower hinging-brackets, and the intermediate arm carrying a pulley or roll, said rod passing through the brackets and arm, and the operating-cords connected to the latch-rod, and passing over the said pulley or roll, and through eyes or over rolls of said struts, substantially as and for the purpose set forth.

3. In a swinging gate, the combination, with the hinge-post having the plate provided with angle ends supporting the pivotal hinging-rod, of the gate having the upper and lower hinging-brackets, and the arm intermediately disposed between said brackets and carrying a roll or pulley, the cord-supporting struts connected to the hinging-rod, and the operating-cord connected to the latch-operating rod and passing through eyes or over pulleys of the struts and the pulley of said arm, substantially as and for the purpose set forth.

4. In a swinging gate, the combination, with the post having a plate provided with angle ends, and the pivotal hinging-rod connected by adjustable stays to posts, of the gate having the upper and lower hinging-brackets, and the intermediate arm carrying a pulley, the spring-actuated latch and its rod, and the operating-cord connected to said rod and passed through eyes or over pulleys of the struts connected to said pivotal or hinging rod, and over the pulley of said arm, substantially as and for the purpose set forth.

JOHN H. BRAFFORD.

Witnesses:
W. H. ARMSTRONG,
P. D. NEWCOMB.